US012283977B2

(12) United States Patent
Kishimoto

(10) Patent No.: US 12,283,977 B2
(45) Date of Patent: Apr. 22, 2025

(54) HIGH FREQUENCY CIRCUIT, DIVERSITY MODULE, AND COMMUNICATION APPARATUS

(71) Applicant: Murata Manufacturing Co., Ltd., Kyoto (JP)

(72) Inventor: Masanori Kishimoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 411 days.

(21) Appl. No.: 17/930,554

(22) Filed: Sep. 8, 2022

(65) Prior Publication Data
US 2023/0006700 A1  Jan. 5, 2023

Related U.S. Application Data

(63) Continuation of application No. PCT/JP2021/011278, filed on Mar. 18, 2021.

(30) Foreign Application Priority Data

Apr. 10, 2020  (JP) ................. 2020-071312

(51) Int. Cl.
 *H04B 1/00* (2006.01)
 *H04B 1/04* (2006.01)
(52) U.S. Cl.
 CPC ............ *H04B 1/0057* (2013.01); *H04B 1/04* (2013.01); *H04B 2001/0408* (2013.01)
(58) Field of Classification Search
 CPC ................ H04B 1/0057; H04B 1/04; H04B 2001/0408; H04B 1/52; H04B 7/08
 (Continued)

(56) References Cited

U.S. PATENT DOCUMENTS

| 2003/0102494 A1 | 6/2003 | Akamine et al. |
| 2007/0030095 A1* | 2/2007 | Hikita ............ H04B 1/52 |
| | | 333/133 |

(Continued)

FOREIGN PATENT DOCUMENTS

| JP | 2003-168736 A | 6/2003 |
| JP | 2006-094557 A | 4/2006 |

(Continued)

OTHER PUBLICATIONS

International Search Report for PCT/JP2021/011278 dated Jun. 22, 2021.

*Primary Examiner* — Eugene Yun
(74) *Attorney, Agent, or Firm* — McDonald Hopkins LLC

(57) ABSTRACT

A high frequency circuit includes a main module and a diversity module. The main module includes a duplexer that transmits and receives a signal of a first communication band of a first communication system. The diversity module includes a duplexer that transmits and receives a signal of a second communication band of a second communication system, a reception filter that uses a reception band of the first communication band of the first communication system as a pass band, a power amplifier, a low noise amplifier, and a switch that exclusively switches between connection between a reception filter and the low noise amplifier and connection between the reception filter and the low noise amplifier. The first communication band and the second communication band have the same frequency band.

20 Claims, 6 Drawing Sheets

(58) Field of Classification Search
USPC .......................................................... 455/130
See application file for complete search history.

(56) References Cited

U.S. PATENT DOCUMENTS

| | | |
|---|---|---|
| 2010/0189031 A1 | 7/2010 | Kanou |
| 2014/0342678 A1* | 11/2014 | Khlat ........................ H04B 1/44 |
| | | 455/78 |
| 2014/0349592 A1* | 11/2014 | Okazaki ................... H04B 1/50 |
| | | 455/75 |
| 2015/0229348 A1 | 8/2015 | Yan |
| 2016/0127015 A1 | 5/2016 | Wloczysiak et al. |
| 2020/0036401 A1* | 1/2020 | Ella ......................... H04B 1/525 |
| 2020/0412403 A1* | 12/2020 | Pehlke ...................... H04L 5/14 |

FOREIGN PATENT DOCUMENTS

| | | |
|---|---|---|
| JP | 2016-208311 A | 12/2016 |
| JP | 2017-508378 A | 3/2017 |
| WO | 2008/078792 A1 | 7/2008 |

* cited by examiner

HIGH FREQUENCY CIRCUIT, DIVERSITY MODULE, AND COMMUNICATION APPARATUS

CROSS REFERENCE TO RELATED APPLICATION

This is a continuation of International Application No. PCT/JP2021/011278 filed on Mar. 18, 2021 which claims priority from Japanese Patent Application No. 2020-071312 filed on Apr. 10, 2020. The contents of these applications are incorporated herein by reference in their entireties.

BACKGROUND ART

Technical Field

The present disclosure relates to a high frequency circuit, a diversity module, and a communication apparatus.

Simultaneous transmission of a plurality of high frequency signals with low loss has been demanded for high frequency front end circuits supporting multiple bands and multiple modes.

In Patent Document 1, a reception module (transmission circuit) that has a configuration in which a plurality of filters having different pass bands are connected to an antenna with a multiplexer interposed therebetween is disclosed.

Patent Document 1: U.S. Patent Application Publication No. 2016/0127015

BRIEF SUMMARY

The reception module (transmission circuit) described in Patent Document 1 is capable of simultaneous transmission of high frequency signals of a plurality of communication bands of a single communication system. Meanwhile in recent years, transmission of two or more high frequency signals of overlapping frequency bands of different communication systems (for example, a fourth-generation mobile communication system and a fifth-generation mobile communication system) by using a combination of two transmission circuits having a primary transmission and reception function and a diversity function, has been suggested.

However, transmission of the two or more high frequency signals using the two transmission circuits may cause a problem of degrading transmission loss in diversity reception.

The present disclosure provides a high frequency circuit, a diversity module, and a communication apparatus in which degradation of transmission loss in diversity reception is reduced.

A high frequency circuit according to an aspect of the present disclosure includes a first transmission circuit that transmits a high frequency signal of a first communication system; and a second transmission circuit that transmits high frequency signals of the first communication system and a second communication system different from the first communication system. The first transmission circuit includes a first transmission filter that uses a transmission band of a first communication band of the first communication system as a pass band, and a first reception filter that uses a reception band of the first communication band of the first communication system as a pass band. The second transmission circuit includes a duplexer that includes a second transmission filter using a transmission band of a second communication band of the second communication system as a pass band and a second reception filter using a reception band of the second communication band of the second communication system as a pass band, a third reception filter that uses the reception band of the first communication band of the first communication system as a pass band, a first power amplifier that is connected to an input terminal of the second transmission filter, a first low noise amplifier, and a switch that exclusively switches between connection between the second reception filter and the first low noise amplifier and connection between the third reception filter and the first low noise amplifier. The first communication band and the second communication band have a same frequency band. The third reception filter is different from the second reception filter.

A diversity module according to an aspect of the present disclosure, in contrast to a main module that transmits and receives a high frequency signal of a first communication band of a first communication system, receives a high frequency signal of the first communication band of the first communication system. The diversity module includes a second transmission filter that uses a transmission band of a second communication band of a second communication system as a pass band, the second communication system being different from the first communication system; a second reception filter that uses a reception band of the second communication band of the second communication system as a pass band; a third reception filter that uses a reception band of the first communication band of the first communication system as a pass band, the third reception filter being different from the second reception filter; a power amplifier that is connected to an input terminal of the second transmission filter; a low noise amplifier; and a switch that exclusively switches between connection between the second reception filter and the low noise amplifier and connection between the third reception filter and the low noise amplifier. The second transmission filter and the second reception filter configure a duplexer that transmits and receives a high frequency signal of the second communication band using a frequency division duplex method. The first communication band and the second communication band have a same frequency band.

According to the present disclosure, a high frequency circuit, a diversity module, and a communication apparatus in which degradation of transmission loss in diversity reception is reduced can be provided.

DETAILED DESCRIPTION

Figure 1:
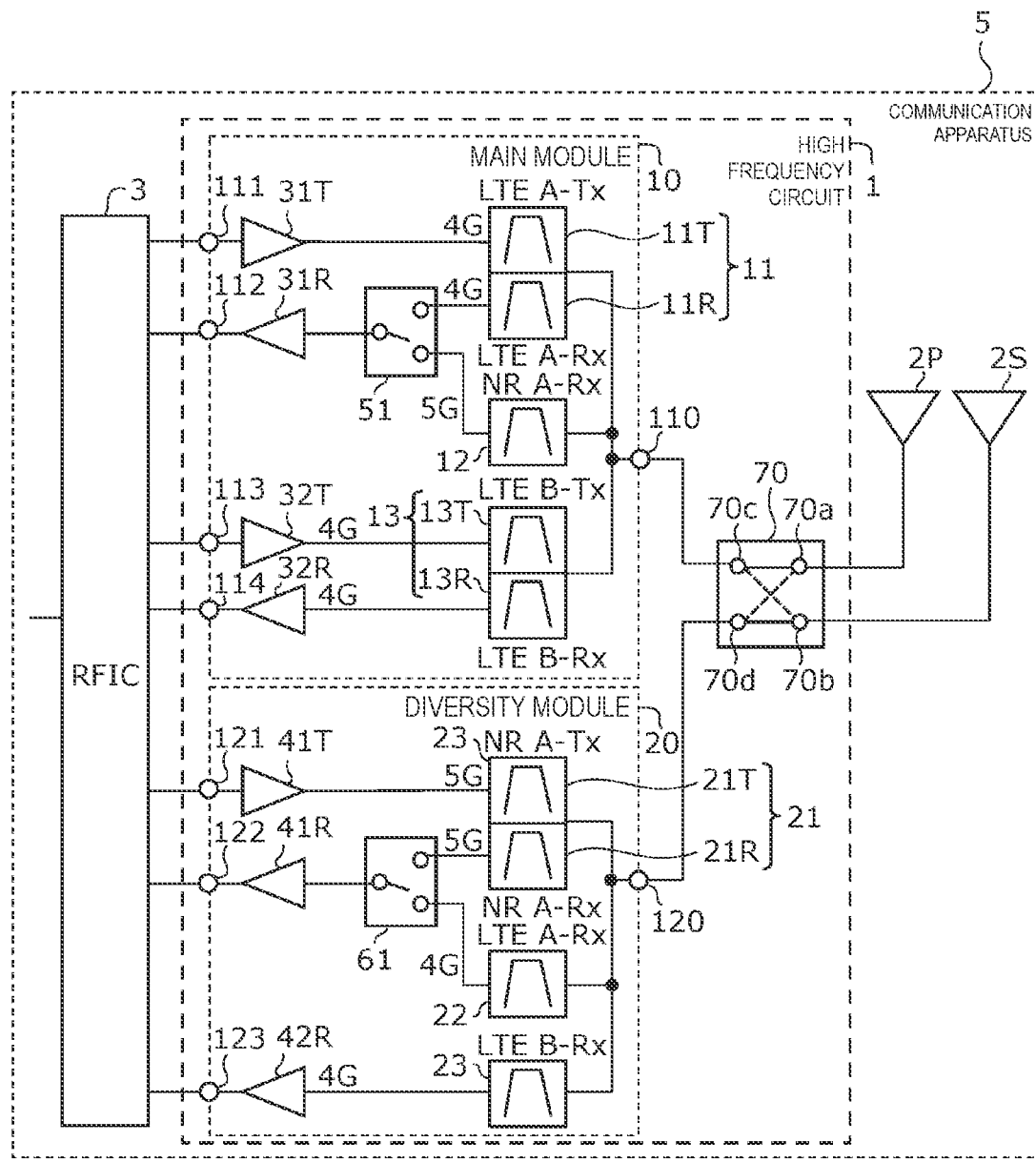
FIG. 1 is a circuit configuration diagram of a high frequency circuit and a communication apparatus according to an embodiment.

Hereinafter, embodiments of the present disclosure will be described in detail with reference drawings. Embodiments described below each represents a comprehensive or specific example. Numerical values, shapes, materials, component elements, arrangements and connection forms of the component elements, and the like described below in the embodiments are merely examples and are thus not intended to limit the present disclosure. Among the component elements in the embodiments, component elements that are not described in independent claims are described as arbitrary component elements. In addition, the sizes or size ratios of component elements illustrated in the drawings are not necessarily precise.

EMBODIMENTS

1 Configuration of High Frequency Circuit 1 and Communication Apparatus 5

FIG. 1 is a circuit configuration diagram of a high frequency circuit 1 and a communication apparatus 5 according to an embodiment. As illustrated in FIG. 1, the communication apparatus 5 includes the high frequency circuit 1, antennas 2P and 2S, and an RF signal processing circuit (RFIC) 3.

The high frequency circuit 1 includes a main module 10, a diversity module 20, and a switch 70.

The main module 10 is an example of a first transmission circuit and transmits a high frequency signal of at least a first communication system out of the first communication system and a second communication system. The main module 10 includes a transmission and reception terminal 110, transmission input terminals 111 and 113, reception output terminals 112 and 114, duplexers 11 and 13, a reception filter 12, a switch 51, power amplifiers 31T and 32T, and low noise amplifiers 31R and 32R.

The first communication system and the second communication system are based on different communication standards. The first communication system is, for example, the fourth-generation mobile communication system (4G), and the second communication system is, for example, the fifth-generation mobile communication system (5G). Furthermore, the first communication system may be 5G and the second communication system may be 4G.

The duplexer 11 transmits and receives a high frequency signal of a first communication band of the first communication system (hereinafter, may be referred to as a frequency band A) using a frequency division duplex method. The duplexer 11 includes a transmission filter 11T and a reception filter 11R.

The transmission filter 11T is an example of a first transmission filter and uses a transmission band of the first communication band of the first communication system (frequency band A) as a pass band. The reception filter 11R is an example of a first reception filter and uses a reception band of the first communication band of the first communication system (frequency band A) as a pass band.

The reception filter 12 is a filter that uses a reception band of a second communication band of the second communication system (hereinafter, may be referred to as a frequency band A) as a pass band.

The first communication band of the first communication system and the second communication band of the second communication system have the same frequency band A.

The power amplifier 31T is an example of a second power amplifier and amplifies a transmission signal input through the transmission input terminal 111. The low noise amplifier 31R is an example of a second low noise amplifier and amplifies a reception signal input through the transmission and reception terminal 110.

The switch 51 includes a first common terminal, a first selection terminal, and a second selection terminal. The first common terminal is connected to an input terminal of the low noise amplifier 31R, the first selection terminal is connected to an output terminal of the reception filter 11R, and the second selection terminal is connected to an output terminal of the reception filter 12. With the connection configuration described above, the switch 51 exclusively switches between connection between the reception filter 11R and the low noise amplifier 31R and connection between the reception filter 12 and the low noise amplifier 31R. The switch 51 includes, for example, a switch circuit of an SPDT (Single Pole Double Throw) type.

An output terminal of the transmission filter 11T and an input terminal of the reception filter 11R are connected to the transmission and reception terminal 110, an input terminal of the transmission filter 11T is connected to an output terminal of the power amplifier 31T, and the output terminal of the reception filter 11R is connected to the input terminal of the low noise amplifier 31R with the switch 51 interposed therebetween. Furthermore, an input terminal of the reception filter 12 is connected to the transmission and reception terminal 110, and the output terminal of the reception filter 12 is connected to the input terminal of the low noise amplifier 31R with the switch 51 interposed therebetween.

The duplexer 13 transmits and receives a high frequency signal of a third communication band of the first communication system (hereinafter, may be referred to as a frequency band B) using the frequency division duplex method. The duplexer 13 includes a transmission filter 13T and a reception filter 13R.

The transmission filter 13T is an example of a fourth transmission filter and uses a transmission band of the third communication band of the first communication system (frequency band B) as a pass band. The reception filter 13R is an example of a fourth reception filter and uses a reception band of the third communication band of the first communication system (frequency band B) as a pass band.

The first communication band of the first communication system (frequency band A) and the third communication band of the first communication system (frequency band B) have different frequency bands.

The power amplifier 32T is an example of a fourth power amplifier and amplifies a transmission signal input through the transmission input terminal 113. The low noise amplifier 32R is an example of a fourth low noise amplifier and amplifies a reception signal input through the transmission and reception terminal 110.

An output terminal of the transmission filter 13T and an input terminal of the reception filter 13R are connected to the transmission and reception terminal 110, an input terminal of the transmission filter 13T is connected to an output terminal of the power amplifier 32T, and an output terminal of the reception filter 13R is connected to an input terminal of the low noise amplifier 32R.

The main module 10 does not necessarily include the reception filter 12, the switch 51, the duplexer 13, the power amplifier 32T, and the low noise amplifier 32R. That is, the main module 10 only needs to include a function for transmitting and receiving a high frequency signal of the first communication band of the first communication system.

The power amplifiers 31T and 32T and the low noise amplifiers 31R and 32R include, for example, Si-based CMOSs (Complementary Metal Oxide Semiconductors), GaAs-based field-effect transistors (FETs) or hetero-bipolar transistors (HBTs), or the like.

The low noise amplifiers 31R and 32R and the switch 51 in the main module 10 may be formed in a semiconductor IC (Integrated Circuit). In other words, the low noise amplifiers 31R and 32R and the switch 51 may be formed as a single chip on the same IC substrate. The semiconductor IC includes, for example, a CMOS. Specifically, the semiconductor IC is formed by a SOI process. Thus, the semiconductor IC can be manufactured at low price. The semiconductor IC may be made of at least one of GaAs, SiGe, and GaN. Thus, the semiconductor IC is capable of outputting a high frequency signal with high-quality amplification performance and noise performance. Furthermore, the semiconductor IC may further include the power amplifiers 31T and 32T.

Furthermore, the duplexers 11 and 13, the reception filter 12, the switch 51, the power amplifiers 31T and 32T, and the low noise amplifiers 31R and 32R configuring the main module 10 may be formed on a single mounting substrate.

The diversity module 20 is an example of a second transmission circuit and transmits high frequency signals of the first communication system and the second communication system. The diversity module 20 includes a transmission and reception terminal 120, a transmission input terminal 121, reception output terminals 122 and 123, a duplexer 21, reception filters 22 and 23, a switch 61, a power amplifier 41T, and low noise amplifiers 41R and 42R.

The duplexer 21 transmits and receives a high frequency signal of the second communication band of the second communication system (hereinafter, may be referred to as a frequency band A) using the frequency division duplex method. The duplexer 21 includes a transmission filter 21T and a reception filter 21R.

The transmission filter 21T is an example of a second transmission filter and uses a transmission band of the second communication band of the second communication system (frequency band A) as a pass band. The reception filter 21R is an example of a second reception filter and uses a reception band of the second communication band of the second communication system (frequency band A) as a pass band.

The reception filter 22 is an example of a third reception filter and uses a reception band of the first communication band of the first communication system (frequency band A) as a pass band. The reception filter 22 is arranged independently of the reception filter 21R.

The power amplifier 41T is an example of a first power amplifier and amplifies a transmission signal input through the transmission input terminal 121. The low noise amplifier 41R is an example of a first low noise amplifier and amplifies a reception signal input through the transmission and reception terminal 120.

The switch 61 includes a second common terminal, a third selection terminal, and a fourth selection terminal. The second common terminal is connected to an input terminal of the low noise amplifier 41R, the third selection terminal is connected to an output terminal of the reception filter 21R, and the fourth selection terminal is connected to an output terminal of the reception filter 22. With the connection configuration described above, the switch 61 exclusively switches between connection between the reception filter 21R and the low noise amplifier 41R and connection between the reception filter 22 and the low noise amplifier 41R. The switch 61 includes, for example, a switch circuit of the SPDT type.

An output terminal of the transmission filter 21T and an input terminal of the reception filter 21R are connected to the transmission and reception terminal 120, an input terminal of the transmission filter 21T is connected to an output terminal of the power amplifier 41T, and the output terminal of the reception filter 21R is connected to the input terminal of the low noise amplifier 41R with the switch 61 interposed therebetween. Furthermore, an input terminal of the reception filter 22 is connected to the transmission and reception terminal 120, and the output terminal of the reception filter 22 is connected to the input terminal of the low noise amplifier 41R with the switch 61 interposed therebetween.

The reception filter 23 is an example of a fifth reception filter and uses a reception band of the third communication band of the first communication system (frequency band B) as a pass band.

The low noise amplifier 42R is an example of a fifth low noise amplifier and amplifies a reception signal input through the transmission and reception terminal 120.

An input terminal of the reception filter 23 is connected to the transmission and reception terminal 120, and an output terminal of the reception filter 23 is connected to an input terminal of the low noise amplifier 42R.

The diversity module 20 does not necessarily include the reception filter 23 and the low noise amplifier 42R. That is, the diversity module 20 only needs to include a function for transmitting and receiving a high frequency signal of the second communication band of the second communication system and a diversity function for receiving a high frequency signal of the first communication band of the first communication system.

The power amplifier 41T and the low noise amplifiers 41R and 42R include, for example, Si-based CMOSs, GaAs-based FETs or HBTs, or the like.

The low noise amplifiers 41R and 42R and the switch 61 in the diversity module 20 may be formed in a semiconductor IC. In other words, the low noise amplifiers 41R and 42R and the switch 61 may be formed as a single chip on the same IC substrate. The semiconductor IC includes, for example, a CMOS. Specifically, the semiconductor IC is formed by the SOI process. Thus, the semiconductor IC can be manufactured at low price. The semiconductor IC may be made of at least one of GaAs, SiGe, and GaN. Thus, the semiconductor IC is capable of outputting a high frequency signal with high-quality amplification performance and noise performance. Furthermore, the semiconductor IC may further include the power amplifier 41T.

Furthermore, the duplexer 21, the reception filters 22 and 23, the switch 61, the power amplifier 41T, and the low noise amplifiers 41R and 42R configuring the diversity module 20 may be formed on a single mounting substrate.

The switch 70 includes antenna terminals 70a and 70b and selection terminals 70c and 70d. The antenna terminal 70a is connected to the antenna 2P, and the antenna terminal 70b is connected to the antenna 2S. Furthermore, the selection terminal 70c is connected to the transmission and reception terminal 110 of the main module 10, and the selection terminal 70d is connected to the transmission and reception terminal 120 of the diversity module 20. The number of selection terminals is not limited to two, the selection terminals 70c and 70d, and may be three or more.

The switch 70 exclusively selects between electrical connection between the antenna terminal 70a and the selection terminal 70c and electrical connection between the antenna terminal 70a and the selection terminal 70d and exclusively selects between electrical connection between the antenna terminal 70b and the selection terminal 70c and electrical connection between the antenna terminal 70b and the selection terminal 70d. Thus, based on a combination of a communication system and a communication band of a high frequency signal transmitted in the high frequency circuit 1, the antenna 2P can be connected to one of the main module 10 and the diversity module 20, and the antenna 2S can be connected to the other one of the main module 10 and the diversity module 20.

The switch 70 is, for example, a switch circuit of a DPDT (Double Pole Double Throw) type including the antenna terminals 70a and 70b and the selection terminals 70c and 70d. The switch 70 may be a switch circuit of a DP3T type, a DP4T type, or the like. In the case where the switch 70 is a switch circuit of the DP3T type, the DP4T type, or the like, suitable terminals corresponding to the number of connected transmission circuits are used.

The antenna 2P is an example of a first antenna. The antenna 2P is connected to the antenna terminal 70a of the switch 70, emits and transmits a high frequency signal, and receives a high frequency signal. The antenna 2S is an example of a second antenna. The antenna 2S is connected to the antenna terminal 70b of the switch 70, emits and transmits a high frequency signal, and receives a high frequency signal.

The high frequency circuit 1 according to this embodiment does not necessarily include the switch 70. In the case where the high frequency circuit 1 does not include the switch 70, the antenna 2P may be directly connected to the transmission and reception terminal 110, the antenna 2S may be directly connected to the transmission and reception terminal 120.

The RFIC 3 is an RF signal processing circuit that processes a high frequency signal. Specifically, the RFIC 3 performs signal processing, such as up-conversion, on a transmission signal input from a baseband signal processing circuit (not illustrated in the drawing), and outputs the transmission signal generated by the signal processing to the main module 10 and the diversity module 20.

Furthermore, the RFIC 3 includes a controller that outputs control signals for switching the connection state of the switches 51, 61, and 70, on the basis of a combination of a communication system and a communication band of a high frequency signal transmitted in the high frequency circuit 1, to the switches 51, 61, and 70.

With the configuration described above, in the high frequency circuit 1, the main module 10 is capable of performing: (1) transmission and reception of a high frequency signal of the first communication band of the first communication system (frequency band A); (2) (diversity) reception of a high frequency signal of the second communication band of the second communication system (frequency band A); and (3) transmission and reception of a high frequency signal of the third communication band of the first communication system (frequency band B). Furthermore, in the high frequency circuit 1, the diversity module 20 is capable of performing: (4) transmission and reception of a high frequency signal of the second communication band of the second communication system (frequency band A); (5) (diversity) reception of a high frequency signal of the first communication band of the first communication system (frequency band A); and (6) (diversity) reception of a high frequency signal of the third communication band of the first communication system (frequency band B). The high frequency circuit 1 is capable of performing (1) and (5) at the same time, performing (2) and (4) at the same time, performing (3) and (6) at the same time, and performing (2). (3), (4), and (6) at the same time.

Figure 2A:
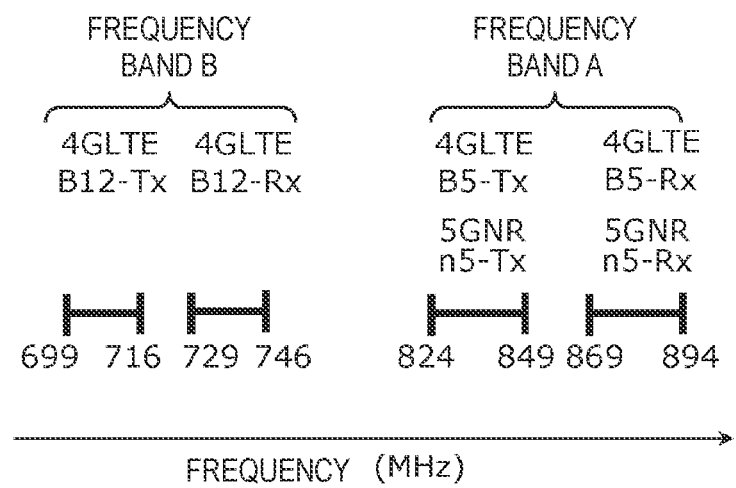
FIG. 2A is a diagram illustrating a first example of a combination of communication bands used for a high frequency circuit according to an embodiment.
Figure 2B:
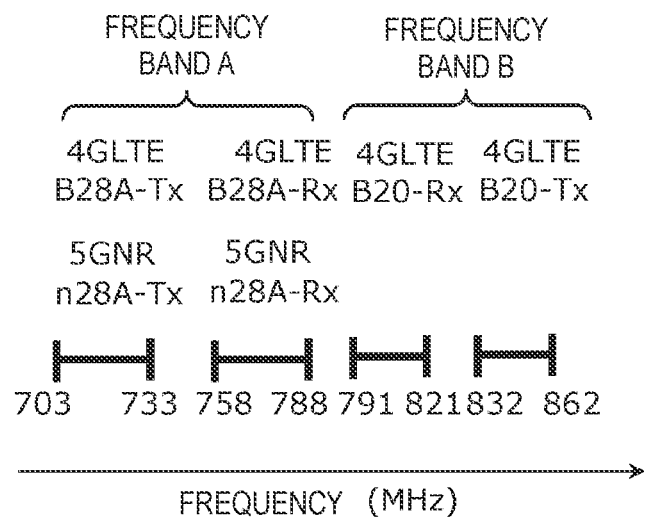
FIG. 2B is a diagram illustrating a second example of a combination of communication bands used for a high frequency circuit according to an embodiment.

FIG. 2A is a diagram illustrating a first example of a combination of communication bands used for the high frequency circuit 1 according to an embodiment. FIG. 2B is a diagram illustrating a second example of a combination of communication bands used for the high frequency circuit 1 according to an embodiment.

In the high frequency circuit 1 according to this embodiment, for example, the first communication system is 4G and the second communication system is 5G.

As illustrated in the first example in FIG. 2A, 4G LTE (Long Term Evolution) Band 5 (transmission band: 824 MHz to 849 MHz, reception band: 869 MHz to 894 MHz) is used as the first communication band (frequency band A), and 5G NR (New Radio) n5 (transmission band: 824 MHz to 849 MHz, reception band: 869 MHz to 894 MHz) is used as the second communication band (frequency band A). Furthermore, 4G LTE Band 12 (transmission band: 699 MHz to 716 MHz, reception band: 729 MHz to 746 MHz) is used as the third communication band (frequency band B). 4G LTE Band 5 as the first communication band and 5G NR n5 as the second communication band have the same frequency band.

Furthermore, as illustrated in the second example in FIG. 2B, 4G LTE Band 28A (transmission band: 703 MHz to 733 MHz, reception band: 758 MHz to 788 MHz) is used as the first communication band (frequency band A), and 5G NR n28A (transmission band: 703 MHz to 733 MHz, reception band: 758 MHz to 788 MHz) is used as the second communication band (frequency band A). Furthermore, 4G LTE Band 20 (transmission band: 832 MHz to 862 MHz, reception band: 791 MHz to 821 MHz) is used as the third communication band (frequency band B). 4G LTE Band 28A as the first communication band and 5G NR n28A as the second communication band have the same frequency band.

Figure 3:
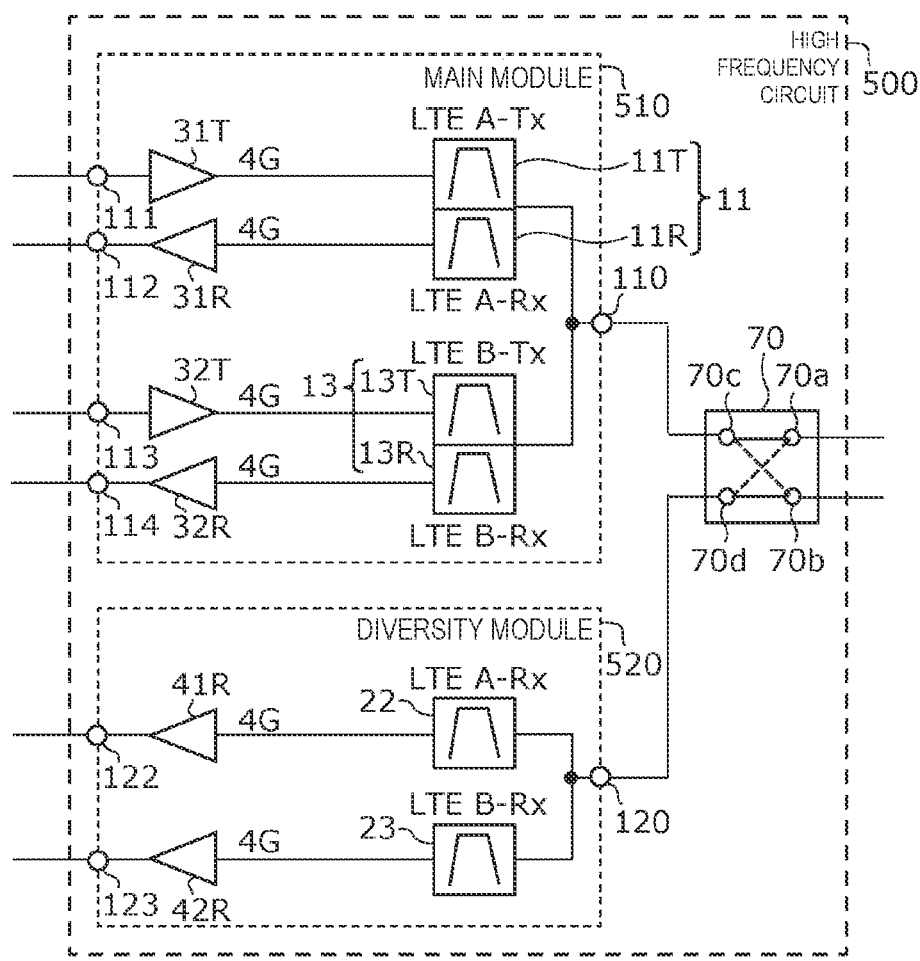
FIG. 3 is a circuit configuration diagram of a high frequency circuit according to a comparative example.

FIG. 3 is a circuit configuration diagram of a high frequency circuit 500 according to a comparative example. As illustrated in FIG. 3, the high frequency circuit 500 includes a main module 510, a diversity module 520, and the switch 70. The high frequency circuit 500 according to the comparative example is different from the high frequency circuit 1 according to the embodiment in the circuit configuration of the main module 510 and the diversity module 520. The high frequency circuit 500 according to the comparative example will be described below by focusing on features different from the high frequency circuit 1 according to the embodiment and omitting explanation for the same features as those of the high frequency circuit 1 according to the embodiment.

The main module 510 transmits a high frequency signal of the first communication system. The main module 510 includes the transmission and reception terminal 110, the transmission input terminals 111 and 113, the reception output terminals 112 and 114, the duplexers 11 and 13, the power amplifiers 31T and 32T, and the low noise amplifiers 31R and 32R.

The first communication system is, for example, 4G. The first communication system may be 5G.

The duplexer 11 transmits and receives a high frequency signal of the first communication band of the first communication system (frequency band A) using the frequency division duplex method.

The power amplifier 31T amplifies a transmission signal input through the transmission input terminal 111. The low noise amplifier 31R amplifies a reception signal input through the transmission and reception terminal 110.

The duplexer 13 transmits and receives a high frequency signal of the third communication band of the first communication system (frequency band B) using the frequency division duplex method.

The first communication band of the first communication system (frequency band A) and the third communication band of the first communication system (frequency band B) have different frequency bands.

The power amplifier 32T amplifies a transmission signal input through the transmission input terminal 113. The low noise amplifier 32R amplifies a reception signal input through the transmission and reception terminal 110.

The diversity module 520 transmits a high frequency signal of the first communication system. The diversity module 520 includes the transmission and reception terminal 120, the transmission input terminal 121, the reception output terminals 122 and 123, the reception filters 22 and 23, and the low noise amplifiers 41R and 42R.

The reception filter 22 is a filter that uses a reception band of the first communication band of the first communication system (frequency band A) as a pass band.

The low noise amplifier 41R amplifies a reception signal input through the transmission and reception terminal 120.

The reception filter 23 is a filter that uses a reception band of the third communication band of the first communication system (frequency band B) as a pass band.

The low noise amplifier 42R amplifies a reception signal input through the transmission and reception terminal 120.

With the configuration described above, the main module 510 performs (1) transmission and reception of a high frequency signal of the first communication band of the first communication system (frequency band A); and (2) transmission and reception of a high frequency signal of the third communication band of the first communication system (frequency band B). Meanwhile, the diversity module 520 performs (3) (diversity) reception of a high frequency signal of the first communication band of the first communication system (frequency band A) when (1) is performed; and (4) (diversity) reception of a high frequency signal of the third communication band of the first communication system (frequency band B) when (2) is performed.

In recent years, suggestion that two or more high frequency signals of different communication systems and overlapping frequency bands are transmitted in a combination of two transmission circuits having a primary transmission and reception function and a diversity function has been provided.

In the case where the above-mentioned two or more high frequency signals are transmitted using the high frequency circuit 500 according to the comparative example, it is assumed that a function for transmitting and receiving a high frequency signal of the second communication band of the second communication system (frequency band A) is added to the diversity module 520. That is, a duplexer that transmits and receives a high frequency signal of the second communication band of the second communication system (frequency band A) and a power amplifier that amplifies a transmission signal of the second communication band of the second communication system (frequency band A) are added to the diversity module 520. In this case, the pass band of a reception filter configuring the duplexer and the pass band of the reception filter 22 have the same frequency. Thus, the reception filter 22 is removed.

That is, in the case where a high frequency signal of the second communication band of the second communication system (frequency band A) is transmitted and received using the diversity module 520, a transmission signal passes through the power amplifier that amplifies a transmission signal of the second communication band of the second communication system (frequency band A) and a transmission filter configuring the duplexer. Meanwhile, a reception signal passes through the reception filter configuring the duplexer and the low noise amplifier 41R. With the diversity function, a reception signal of the first communication band of the first communication system (frequency band A) also passes through the reception filter configuring the duplexer and the low noise amplifier 41R.

However, in the case where a function for transmitting and receiving a high frequency signal of the second communication band of the second communication system (frequency band A) is added to the high frequency circuit 500 according to the comparative example, when the diversity function is performed, a reception signal of the first communication band of the first communication system (frequency band A) passes through the reception filter of the duplexer. Thus, there is a problem that transmission loss increases compared to the case where a reception signal transmits through a separate reception filter. To achieve a high isolation between transmission and reception, duplexers ensure a large attenuation amount in the reception band of the transmission filter and a large attenuation amount in the transmission band of the reception filter. Thus, insertion loss in the pass bands of the transmission filter and the reception filter configuring the duplexer is larger than insertion loss in the pass bands of a separate transmission filter and a separate reception filter that do not configure a duplexer.

In the high frequency circuit 1 according to this embodiment, the reception filter 22 that transmits a reception signal of the first communication band of the first communication system (frequency band A) is arranged independently of the duplexer 21 that transmits and receives a high frequency signal of the second communication band of the second communication system (frequency band A). That is, in the case where the diversity function is performed, the duplexer 21 is not used but the reception filter 22, which is arranged independently, is used. Thus, compared to the configuration in which the diversity function is performed using the reception filter 21R of the duplexer 21, transmission loss of the reception signal of the first communication band of the first communication system (frequency band A) can be reduced. Therefore, the diversity module 20, the high frequency circuit 1, and the communication apparatus 5 in which degradation of transmission loss in diversity reception is reduced can be provided.

2. Flows of Signals in High Frequency Circuit 1

Flows of signals in the high frequency circuit 1 according to an embodiment will be described below. For easier understanding of the flows of signals, the communication systems and the communication bands illustrated in FIG. 2A are used. That is, the first communication system is 4G, and the second communication system is 5G. Furthermore, the first communication band is 4G LTE Band 5, the second communication band is 5G NR n5, and the third communication band is 4G LTE Band 12.

Figure 4:
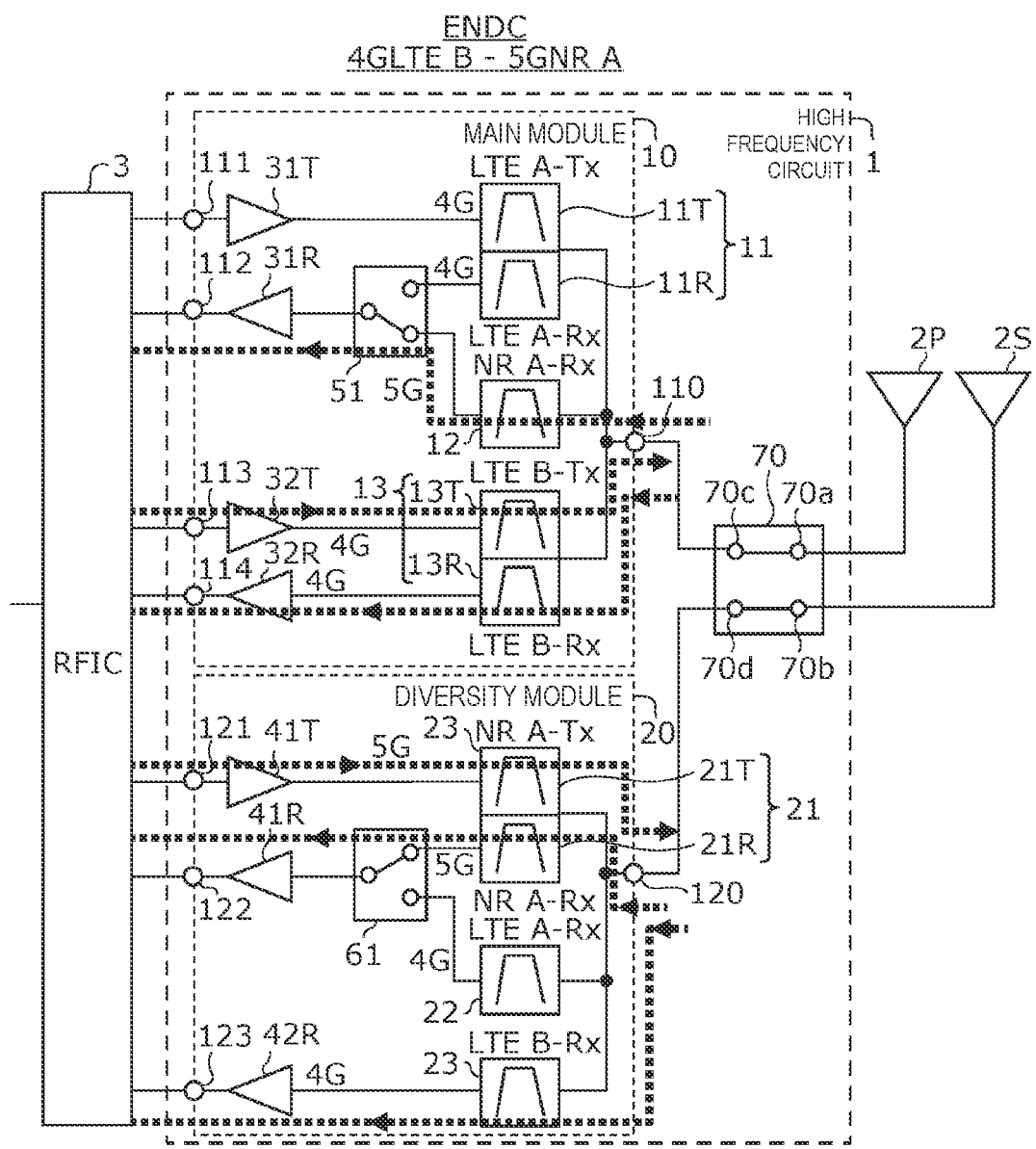
FIG. 4 is a circuit diagram illustrating flows of signals in ENDC in a high frequency circuit according to an embodiment.

FIG. 4 is a circuit diagram illustrating flows of signals in ENDC (LTE-NR Dual Connectivity) in the high frequency circuit 1 according to an embodiment. In FIG. 4, flows of signals in simultaneous transmission (ENDC) of a high frequency signal of 4G LTE Band 12 and a high frequency signal of 5G NR n5.

In the main module 10, a transmission signal of 4G LTE Band 12 flows through the RFIC 3, the transmission input terminal 113, the power amplifier 32T, the transmission filter 13T, and the transmission and reception terminal 110 in that order, passes through the switch 70, and is output through the antenna 2P. At the same time, a reception signal of 4G LTE Band 12 flows through the antenna 2P, the switch 70, the transmission and reception terminal 110, the reception filter 13R, the low noise amplifier 32R, and the reception output terminal 114 in that order and is output to the RFIC 3. Furthermore, at the same time, with the diversity function, a reception signal of 5G NR n5 flows through the antenna 2P, the switch 70, the transmission and reception terminal 110, the reception filter 12, the switch 51, the low noise amplifier 31R, and the reception output terminal 112 in that order and is output to the RFIC 3.

Furthermore, at the same time, in the diversity module 20, a transmission signal of 5G NR n5 flows through the RFIC 3, the transmission input terminal 121, the power amplifier 41T, the transmission filter 21T, and the transmission and reception terminal 120 in that order, passes through the switch 70, and is output through the antenna 2S. At the same time, a reception signal of 5G NR n5 flows through the antenna 2S, the switch 70, the transmission and reception terminal 120, the reception filter 21R, the switch 61, the low noise amplifier 41R, and the reception output terminal 122 in that order and is output to the RFIC 3. Furthermore, at the same time, with the diversity function, a reception signal of 4G LTE Band 12 flows through the antenna 2S, the switch 70, the transmission and reception terminal 120, the reception filter 23, the low noise amplifier 42R, and the reception output terminal 123 in that order and is output to the RFIC 3.

With the flows described above, in the case where 5G NR n5 transmission and reception is performed in the diversity module 20, the diversity module 20 may be used, at the same time, as a diversity circuit that transmits a reception signal of 4G LTE Band 12.

As illustrated in FIG. 4, in the case where a transmission signal of 5G NR n5 flows through the transmission filter 21T and a reception signal of 5G NR n5 flows through the reception filter 21R in the diversity module 20, neither a transmission signal of 4G LTE Band 5 nor a reception signal of 4G LTE Band 5 flows in the main module 10.

Thus, in the case where 5G NR n5 transmission and reception is performed in the diversity module 20, the main module 10 may be used as a diversity circuit that transmits a reception signal of 5G NR n5.

Figure 5:
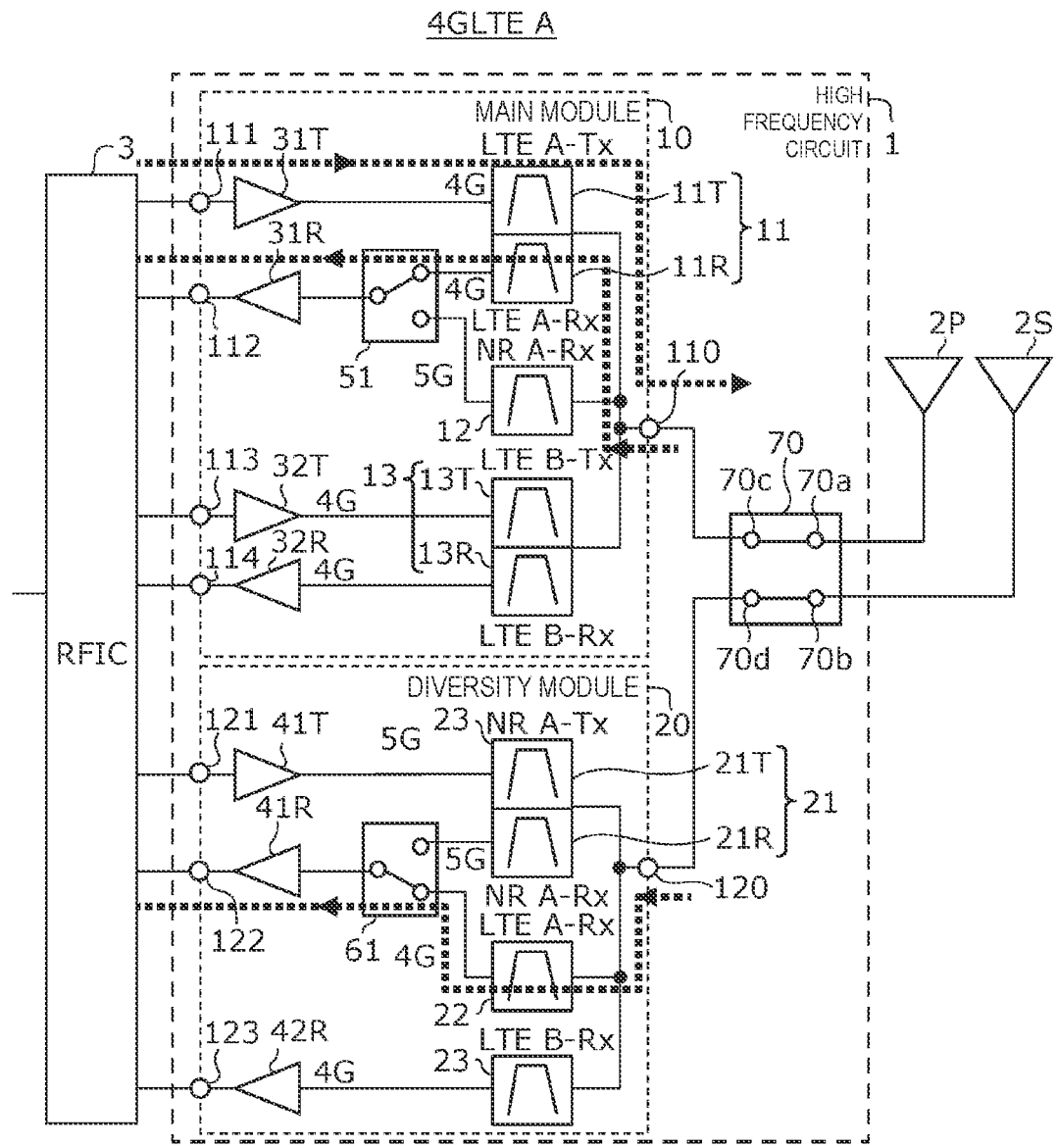
FIG. 5 is a circuit diagram illustrating flows of signals in 4G LTE Band 5 transmission and reception in a high frequency circuit according to an embodiment.

FIG. 5 is a circuit diagram illustrating flows of signals in 4G LTE Band 5 transmission and reception in a high frequency circuit according to an embodiment. In FIG. 5, the state in which a high frequency signal of 4G LTE Band 5 flows in the main module 10 and a reception signal of 4G LTE Band 5 flows in the diversity module 20 is illustrated.

In the main module 10, a transmission signal of 4G LTE Band 5 flows through the RFIC 3, the transmission input terminal 111, the power amplifier 31T, the transmission filter 11T, and the transmission and reception terminal 110 in that order, passes through the switch 70, and is output through the antenna 2P. At the same time, a reception signal of 4G LTE Band 5 flows through the antenna 2P, the switch 70, the transmission and reception terminal 110, the reception filter 11R, the switch 51, the low noise amplifier 31R, and the reception output terminal 112 in that order and is output to the RFIC 3.

Furthermore, at the same time, in the diversity module 20, a reception signal of 4G LTE Band 5 flows through the antenna 2S, the switch 70, the transmission and reception terminal 120, the reception filter 22, the switch 61, the low noise amplifier 41R, and the reception output terminal 122 in that order and is output to the RFIC 3.

In the diversity module 20, the reception filter 22 that transmits a reception signal of 4G LTE Band 5 is arranged independently of the duplexer 21 that transmits and receives a high frequency signal of 5G NR n5. That is, in the case where the diversity module 20 performs the diversity function, the duplexer 21 is not used but the reception filter 22, which is arranged independently, is used. Thus, compared to the configuration in which the diversity function is performed using the reception filter 21R of the duplexer 21, transmission loss of a reception signal of 4G LTE Band 5 can be reduced. Therefore, the diversity module 20, the high frequency circuit 1, and the communication apparatus 5 in which degradation of transmission loss in diversity reception is reduced can be provided.

Figure 6:
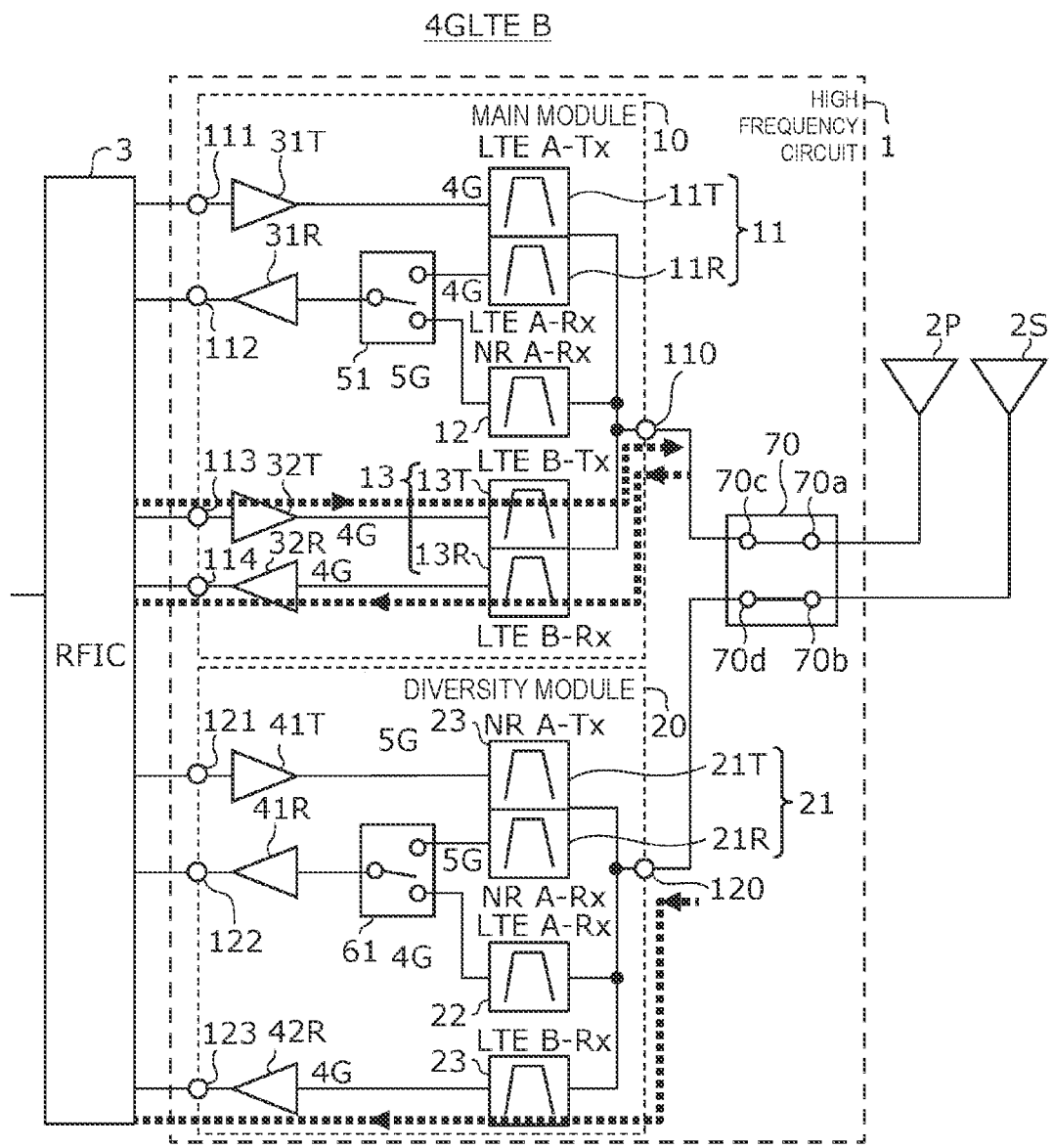
FIG. 6 is a circuit diagram illustrating flows of signals in 4G LTE Band 12 transmission and reception in a high frequency circuit according to an embodiment.

FIG. 6 is a circuit diagram illustrating flows of signals in 4G LTE Band 12 transmission and reception in the high frequency circuit 1 according to an embodiment. In FIG. 6, the state in which a high frequency signal of 4G LTE Band 12 flows in the main module 10 and a reception signal of 4G LTE Band 12 flows in the diversity module 20 is illustrated.

In the main module 10, a transmission signal of 4G LTE Band 12 flows through the RFIC 3, the transmission input terminal 113, the power amplifier 32T, the transmission filter 13T, and the transmission and reception terminal 110 in that order, passes through the switch 70, and is output through the antenna 2P. At the same time, a reception signal of 4G LTE Band 12 flows through the antenna 2P, the switch 70, the transmission and reception terminal 110, the reception filter 13R, the low noise amplifier 32R, and the reception output terminal 114 in that order and is output to the RFIC 3.

Furthermore, at the same time, in the diversity module 20, a reception signal of 4G LTE Band 12 flows through the antenna 2S, the switch 70, the transmission and reception terminal 120, the reception filter 23, the low noise amplifier 42R, and the reception output terminal 123 in that order and is output to the RFIC 3.

3. Effects and so On

As described above, according to an embodiment described above, the high frequency circuit 1 includes the main module 10 that transmits a high frequency signal of the first communication system and the diversity module 20 that transmits high frequency signals of the first communication system and the second communication system. The main module 10 includes the transmission filter 11T that uses the transmission band of the first communication band of the first communication system as a pass band, the reception filter 11R that uses the reception band of the first communication band of the first communication system as a pass band, the power amplifier 31T that is connected to the input terminal of the transmission filter 11T, and the low noise amplifier 31R that is connected to the output terminal of the reception filter 11R. The diversity module 20 includes the duplexer 21 that includes the transmission filter 21T using the transmission band of the second communication band of the second communication system as a pass band and the reception filter 21R using the reception band of the second communication band of the second communication system as a pass band, the reception filter 22 that uses the reception band of the first communication band of the first communication system as a pass band, the power amplifier 41T that is connected to the input terminal of the transmission filter 21T, the low noise amplifier 41R, and the switch 61 that exclusively switches between connection between the reception filter 21R and the low noise amplifier 41R and connection between the reception filter 22 and the low noise amplifier 41R. The first communication band and the second communication band have the same frequency band. The reception filter 22 is different from the reception filter 21R.

As described above, in the diversity module 20, the reception filter 22 that transmits a reception signal of the first communication band of the first communication system is arranged independently of the duplexer 21 that transmits and receives a high frequency signal of the second communication band of the second communication system. That is, in the case where the diversity function is performed, the duplexer 21 is not used but the reception filter 22, which is arranged independently, is used. Thus, compared to the configuration in which the diversity function is performed using the reception filter 21R of the duplexer 21, transmission loss of a reception signal of the first communication band of the first communication system can be reduced. Therefore, the diversity module 20, the high frequency circuit 1, and the communication apparatus 5 in which degradation of transmission loss in diversity reception is reduced can be provided.

Furthermore, in the high frequency circuit 1, the main module 10 may further include the power amplifier 31T that is connected to the input terminal of the transmission filter 11T and the low noise amplifier 31R that is connected to the output terminal of the reception filter 11R.

Furthermore, in the high frequency circuit 1, the main module 10 may further include the transmission filter 13T that uses the transmission band of the third communication band of the first communication system as a pass band, the reception filter 13R that uses the reception band of the third communication band of the first communication system as a pass band, the power amplifier 32T that is connected to the input terminal of the transmission filter 13T, and the low noise amplifier 32R that is connected to the output terminal of the reception filter 13R. The diversity module 20 may further include the reception filter 23 that uses the reception band of the third communication band of the first communication system as a pass band and the low noise amplifier 42R that is connected to the output terminal of the reception filter 23.

Accordingly, the high frequency circuit 1 is capable of performing transmission and reception of a high frequency signal of the third communication band of the first communication system in the main module 10 and transmission and reception of a high frequency signal of the second communication band of the second communication system in the diversity module 20 at the same time.

Furthermore, in the high frequency circuit 1, a transmission signal of the first communication band of the first communication system may flow through the transmission filter 11T and a reception signal of the first communication band of the first communication system may flow through the reception filter 11R in the main module 10, and at the same time, a reception signal of the first communication band of the first communication system may flow through the reception filter 22 in the diversity module 20.

Accordingly, a diversity operation of a high frequency signal of the first communication band of the first communication system in the diversity module 20 can be performed using the reception filter 22 not the duplexer 21. Thus, the diversity module 20 in which degradation of transmission loss in diversity reception is reduced can be provided.

Furthermore, in the high frequency circuit 1, in a case where a transmission signal of the second communication band of the second communication system flows through the transmission filter 21T and a reception signal of the second communication band of the second communication system flows through the reception filter 21R in the diversity module 20, neither a transmission signal of the first communication band of the first communication system nor a reception signal of the first communication band of the first communication system may flow in the main module 10.

Accordingly, in a case where transmission and reception using the second communication band of the second communication system is performed in the diversity module 20, the main module 10 may be used as a diversity circuit that transmits a reception signal of the second communication band of the second communication system.

Furthermore, in the high frequency circuit 1, a transmission signal of the third communication band of the first communication system may flow through the transmission filter 13T and a reception signal of the third communication band of the first communication system may flow through the reception filter 13R in the main module 10, and at the same time, a transmission signal of the second communication band of the second communication system may flow through the transmission filter 21T, a reception signal of the second communication band of the second communication system may flow through the reception filter 21R, and a reception signal of the third communication band of the first communication system may flow through the reception filter 23 in the diversity module 20.

Accordingly, in a case where transmission and reception using the second communication band of the second communication system is performed in the diversity module 20, the diversity module 20 may be used, at the same time, as a diversity circuit that transmits a reception signal of the third communication band of the first communication system.

Furthermore, in the high frequency circuit 1, the first communication system may be one of 4G and 5G, and the second communication system may be the other one of 4G and 5G.

Accordingly, while implementing ENDC, degradation of transmission loss in diversity reception can be reduced.

Furthermore, in the high frequency circuit 1, the first communication system may be 4G, the second communication system may be 5G, the first communication band may be LTE Band 5, and the second communication band may be NR n5.

Furthermore, in the high frequency circuit 1, the first communication system may be 4G, the second communication system may be 5G, the first communication band may be LTE Band 28A, and the second communication band may be NR n28A.

Furthermore, in the high frequency circuit 1, the first communication system may be 4G, the second communication system may be 5G, the first communication band may be LTE Band 5, the second communication band may be NR n5, and the third communication band may be LTE Band 12.

Furthermore, in the high frequency circuit 1, the first communication system may be 4G, the second communication system may be 5G, the first communication band may be LTE Band 28A, the second communication band may be NR n28A, and the third communication band may be LTE Band 20.

Furthermore, the diversity module 20 according to an embodiment is, in contrast to the main module 10 that transmits and receives a high frequency signal of the first communication band of the first communication system, a module that receives a high frequency signal of the first communication band of the first communication system. The diversity module 20 includes the transmission filter 21T that uses the transmission band of the second communication band of the second communication system, which is different from the first communication system, as a pass band, the reception filter 21R that uses the reception band of the second communication band of the second communication system as a pass band, the reception filter 22 that uses the reception band of the first communication band of the first communication system as a pass band and is different from the reception filter 21R, the power amplifier 41T that is connected to the input terminal of the transmission filter 21T, the low noise amplifier 41R, and the switch 61 that exclusively switches between connection between the reception filter 21R and the low noise amplifier 41R and connection between the reception filter 22 and the low noise amplifier 41R. The transmission filter 21T and the reception filter 21R configure the duplexer 21 that transmits and receives a high frequency signal of the second communication band using a frequency division duplex method. The first communication band and the second communication band have the same frequency band.

As described above, in the diversity module 20, the reception filter 22 that transmits a reception signal of the first communication band of the first communication system is arranged independently of the duplexer 21 that transmits and receives a high frequency signal of the second communication band of the second communication system. That is, in the case where the diversity function is performed, the duplexer 21 is not used but the reception filter 22, which is arranged independently, is used. Thus, compared to the configuration in which the diversity function is performed using the reception filter 21R of the duplexer 21, transmission loss of a reception signal of the first communication band of the first communication system can be reduced. Therefore, the diversity module 20 in which degradation of transmission loss in diversity reception is reduced can be provided.

The communication apparatus 5 according to an embodiment includes the antennas 2P and 2S, the RFIC 3 that processes high frequency signals transmitted and received through the antennas 2P and 2S, and the high frequency circuit 1 that transmits high frequency signals to and from the antennas 2P and 2S and the RFIC 3. The antenna 2P is connected to the main module 10, and the antenna 2S is connected to the diversity module 20.

Accordingly, the communication apparatus 5 in which degradation of transmission loss in diversity reception is reduced can be provided.

Other Embodiments

A high frequency circuit, a diversity module, and a communication apparatus according to embodiments of the present disclosure have been described above. A high frequency circuit, a diversity module, and a communication apparatus according to the present disclosure are not limited to the embodiments described above. Other embodiments implemented by combining desired component elements in the embodiments described above, modifications obtained by making various modifications conceived by those skilled in the art to the embodiments without necessarily departing from the spirit of the present disclosure, and various types of equipment including the high frequency circuit, the diversity module, and the communication apparatus according to the embodiments described above are also included in the present disclosure.

Furthermore, for example, in the high frequency circuit, the diversity module, and the communication apparatus according to the embodiments described above, other high frequency circuit elements, wiring, and the like may be inserted between paths connecting circuit elements and signal paths disclosed in the drawings.

Furthermore, a controller according to the present disclosure may be implemented as an IC, which is an integrated circuit, or LSI (Large Scale Integration). Furthermore, circuit integration may be implemented by a dedicated circuit or a general-purpose processor. After fabrication of LSI, an FPGA (Field Programmable Gate Array), which is programmable, or a reconfigurable processor which allows reconfiguration of connections and settings of circuit cells in LSI may be used. Furthermore, if a circuit integration technology replacing LSI appears as a result of advancement in semiconductor technology or other technologies derived from the technology, functional blocks may be integrated using such a technology.

Furthermore, in the embodiments described above, communication systems represent communication systems established using wireless access technology (RAT: Radio Access Technology) defined by standardization bodies or the like (for example, 3GPP, IEEE (Institute of Electrical and Electronics Engineers)). For example, a 5G NR system, a 4G LTE system, a WLAN (Wireless Local Area Network) system, and the like may be used as communication systems. However, communication systems are not limited to those mentioned above.

Furthermore, communication bands represents frequency bands defined in advance by standardization bodies or the like for communication systems. For example, a 5G NR frequency band, a 4G LTE frequency band, and the like may be used as communication bands. However, communication bands are not limited to those mentioned above.

INDUSTRIAL APPLICABILITY

The present disclosure may be widely used as a high frequency circuit, a diversity module, and a communication apparatus that transmit high frequency signals of two or more different communication systems for communication equipment such as a cellular phone.

REFERENCE SIGNS LIST 1, 500 high frequency circuit
2P, 2S antenna
3 RF signal processing circuit (RFIC)
5 communication apparatus
10, 510 main module
11, 13, 21 duplexer
11R, 12, 13R, 21R, 22, 23 reception filter
11T, 13T, 21T transmission filter
20, 520 diversity module
31R, 32R, 41R, 42R low noise amplifier
31T, 32T, 41T power amplifier
51, 61, 70 switch
70a, 70b antenna terminal 70c, 70d selection terminal
110, 120 transmission and reception terminal
111, 113, 121 transmission input terminal
112, 114, 122, 123 reception output terminal

The invention claimed is:

1. A high frequency circuit comprising:
a first transmission circuit that is configured to transmit a high frequency signal of a first communication system; and
a second transmission circuit that is configured to transmit high frequency signals of the first communication system and a second communication system, the second communication system being different from the first communication system,
wherein the first transmission circuit comprises:
a first transmission filter having a pass band that comprises a transmission band of a first communication band of the first communication system, and
a first reception filter having a pass band that comprises a reception band of the first communication band of the first communication system,
wherein the second transmission circuit comprises:
a duplexer that comprises a second transmission filter and a second reception filter, the second transmission filter having a pass band comprising a transmission band of a second communication band of the second communication system, and the second reception filter having a pass band comprising a reception band of the second communication band of the second communication system,
a third reception filter having a pass band comprising the reception band of the first communication band of the first communication system,
a first power amplifier that is connected to an input terminal of the second transmission filter,
a first low noise amplifier, and
a switch that is configured to exclusively selectively connect the first low noise amplifier to the second reception filter or the third reception filter,
wherein the first communication band and the second communication band have a same frequency band, and
wherein the third reception filter is different from the second reception filter.

2. The high frequency circuit according to claim 1, wherein the first transmission circuit further comprises:
a second power amplifier that is connected to an input terminal of the first transmission filter, and
a second low noise amplifier that is connected to an output terminal of the first reception filter.

3. The high frequency circuit according to claim 2, wherein the first transmission circuit further comprises:
a fourth transmission filter having a pass band comprising a transmission band of a third communication band of the first communication system,
a fourth reception filter having a pass band comprising a reception band of the third communication band of the first communication system,
a fourth power amplifier that is connected to an input terminal of the fourth transmission filter, and
a fourth low noise amplifier that is connected to an output terminal of the fourth reception filter, and
wherein the second transmission circuit further comprises:
a fifth reception filter having a pass band comprising the reception band of the third communication band of the first communication system, and
a fifth low noise amplifier that is connected to an output terminal of the fifth reception filter.

4. The high frequency circuit according to claim 2, wherein:
a transmission signal of the first communication band of the first communication system flows through the first transmission filter, and a reception signal of the first communication band of the first communication system flows through the first reception filter in the first transmission circuit, and
at the same time, a reception signal of the first communication band of the first communication system flows through the third reception filter in the second transmission circuit.

5. The high frequency circuit according to claim 2, wherein when a transmission signal of the second communication band of the second communication system flows through the second transmission filter and a reception signal of the second communication band of the second communication system flows through the second reception filter in the second transmission circuit, neither a transmission signal of the first communication band of the first communication system nor a reception signal of the first communication band of the first communication system flows in the first transmission circuit.

6. The high frequency circuit according to claim 2,
wherein the first communication system is one of a fourth-generation mobile communication system (4G) or a fifth-generation mobile communication system (5G), and
wherein the second communication system is the other one of 4G and 5G.

7. The high frequency circuit according to claim 1,
wherein the first transmission circuit further comprises:
a fourth transmission filter having a pass band comprising a transmission band of a third communication band of the first communication system,
a fourth reception filter having a pass band comprising a reception band of the third communication band of the first communication system,
a fourth power amplifier that is connected to an input terminal of the fourth transmission filter, and
a fourth low noise amplifier that is connected to an output terminal of the fourth reception filter, and
wherein the second transmission circuit further comprises:
a fifth reception filter having a pass band comprising the reception band of the third communication band of the first communication system, and
a fifth low noise amplifier that is connected to an output terminal of the fifth reception filter.

8. The high frequency circuit according to claim 7, wherein:
a transmission signal of the third communication band of the first communication system flows through the fourth transmission filter, and a reception signal of the third communication band of the first communication system flows through the fourth reception filter in the first transmission circuit, and
at the same time, a transmission signal of the second communication band of the second communication system flows through the second transmission filter, a reception signal of the second communication band of the second communication system flows through the second reception filter, and a reception signal of the third communication band of the first communication system flows through the fifth reception filter in the second transmission circuit.

9. The high frequency circuit according to claim 7,
wherein the first communication system is a fourth-generation mobile communication system (4G),
wherein the second communication system is a fifth-generation mobile communication system (5G),
wherein the first communication band is Long Term Evolution (LTE) Band 5,
wherein the second communication band is New Radio (NR) n5, and
wherein the third communication band is LTE Band 12.

10. The high frequency circuit according to claim 7,
wherein the first communication system is a fourth-generation mobile communication system (4G),
wherein the second communication system is a fifth-generation mobile communication system (5G),
wherein the first communication band is Long Term Evolution (LTE) Band 28A,
wherein the second communication band is New Radio (NR) n28A, and
wherein the third communication band is LTE Band 20.

11. The high frequency circuit according to claim 7, wherein:
a transmission signal of the first communication band of the first communication system flows through the first transmission filter, and a reception signal of the first communication band of the first communication system flows through the first reception filter in the first transmission circuit, and
at the same time, a reception signal of the first communication band of the first communication system flows through the third reception filter in the second transmission circuit.

12. The high frequency circuit according to claim 7, wherein when a transmission signal of the second communication band of the second communication system flows through the second transmission filter and a reception signal of the second communication band of the second communication system flows through the second reception filter in the second transmission circuit, neither a transmission signal of the first communication band of the first communication system nor a reception signal of the first communication band of the first communication system flows in the first transmission circuit.

13. The high frequency circuit according to claim 7,
wherein the first communication system is one of a fourth-generation mobile communication system (4G) or a fifth-generation mobile communication system (5G), and
wherein the second communication system is the other one of 4G and 5G.

14. The high frequency circuit according to claim 1, wherein:
a transmission signal of the first communication band of the first communication system flows through the first transmission filter, and a reception signal of the first communication band of the first communication system flows through the first reception filter in the first transmission circuit, and
at the same time, a reception signal of the first communication band of the first communication system flows through the third reception filter in the second transmission circuit.

15. The high frequency circuit according to claim 1, wherein when a transmission signal of the second communication band of the second communication system flows through the second transmission filter and a reception signal of the second communication band of the second communication system flows through the second reception filter in the second transmission circuit, neither a transmission signal of the first communication band of the first communication system nor a reception signal of the first communication band of the first communication system flows in the first transmission circuit.

16. The high frequency circuit according to claim 1,
wherein the first communication system is one of a fourth-generation mobile communication system (4G) or a fifth-generation mobile communication system (5G), and
wherein the second communication system is the other one of 4G and 5G.

17. The high frequency circuit according to claim 1,
wherein the first communication system is a fourth-generation mobile communication system (4G),
wherein the second communication system is a fifth-generation mobile communication system (5G),
wherein the first communication band is Long Term Evolution (LTE) Band 5, and
wherein the second communication band is New Radio (NR) n5.

18. The high frequency circuit according to claim 1,
wherein the first communication system is a fourth-generation mobile communication system (4G),
wherein the second communication system is a fifth-generation mobile communication system (5G),
wherein the first communication band is Long Term Evolution (LTE) Band 28A, and
wherein the second communication band is New Radio (NR) n28A.

19. A communication apparatus comprising:
a first antenna;
a second antenna;
a radio frequency (RF) signal processing circuit that is configured to process high frequency signals transmitted and received through the first antenna and the second antenna; and
the high frequency circuit according to claim 1 that is configured to transmit the high frequency signals to and from the first antenna, the second antenna, and the RF signal processing circuit,
wherein the first antenna is connected to the first transmission circuit, and
wherein the second antenna is connected to the second transmission circuit.

20. A second transmission circuit that, in contrast to a first transmission circuit that is configured to transmit and receive a high frequency signal of a first communication band of a first communication system, is configured to receive a high frequency signal of the first communication band of the first communication system, the second transmission circuit comprising:
a second transmission filter having a pass band comprising a transmission band of a second communication band of a second communication system, the second communication system being different from the first communication system;
a second reception filter having a pass band comprising a reception band of the second communication band of the second communication system;
a third reception filter having a pass band comprising a reception band of the first communication band of the first communication system, the third reception filter being different from the second reception filter;

a power amplifier that is connected to an input terminal of the second transmission filter;

a low noise amplifier; and a switch that is configured to exclusively selectively connect the low noise amplifier to the second reception filter or the third reception filter, wherein the second transmission filter and the second reception filter constitute a duplexer that is configured to transmit and receive a high frequency signal of the second communication band using a frequency division duplex method, and wherein the first communication band and the second communication band have a same frequency band.

* * * * *